United States Patent
Snead et al.

(10) Patent No.: US 7,171,671 B2
(45) Date of Patent: Jan. 30, 2007

(54) METHOD AND SYSTEM FOR PROVIDING STATE CHANGE NOTIFICATIONS IN DEVICE DRIVERS

(75) Inventors: Robert R. Snead, Redmond, WA (US); Narasimhan Ramasubramanian, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 557 days.

(21) Appl. No.: 09/935,809

(22) Filed: Aug. 23, 2001

(65) Prior Publication Data

US 2003/0041179 A1    Feb. 27, 2003

(51) Int. Cl.
*G06F 13/00* (2006.01)
(52) U.S. Cl. .................. 719/321; 719/318; 719/322; 719/327
(58) Field of Classification Search ................ 719/319, 719/318, 321, 322, 327
See application file for complete search history.

(56) References Cited

U.S. PATENT DOCUMENTS

| | | | |
|---|---|---|---|
| 5,974,541 A * | 10/1999 | Hall et al. ................ 712/228 |
| 6,256,059 B1 * | 7/2001 | Fichtner .................. 348/222.1 |
| 6,341,322 B1 * | 1/2002 | Liu et al. ...................... 714/38 |
| 6,366,926 B1 * | 4/2002 | Pohlmann et al. ....... 707/104.1 |
| 6,446,136 B1 * | 9/2002 | Pohlmann et al. .......... 719/318 |
| 6,449,663 B1 * | 9/2002 | Carney et al. ................ 710/15 |
| 6,542,075 B2 * | 4/2003 | Barker et al. ............... 340/506 |
| 6,697,870 B1 * | 2/2004 | Cafarelli et al. ............ 709/233 |
| 6,886,171 B2 * | 4/2005 | MacLeod .................... 719/324 |
| 2002/0129101 A1 * | 9/2002 | Tamaki ....................... 709/203 |

* cited by examiner

*Primary Examiner*—William Thomson
*Assistant Examiner*—Andy Ho
(74) *Attorney, Agent, or Firm*—Microsoft Corporation

(57) ABSTRACT

A method and system are provided for asynchronously providing interested applications of state changes in removable devices. A device driver polls the device associated with the driver for state changes. The state changes result in a change notification being generated. The driver provides the change notifications to the interested applications. The present invention also provides a change notification by a device driver to interested applications when a client application initiates a change in the device.

34 Claims, 3 Drawing Sheets

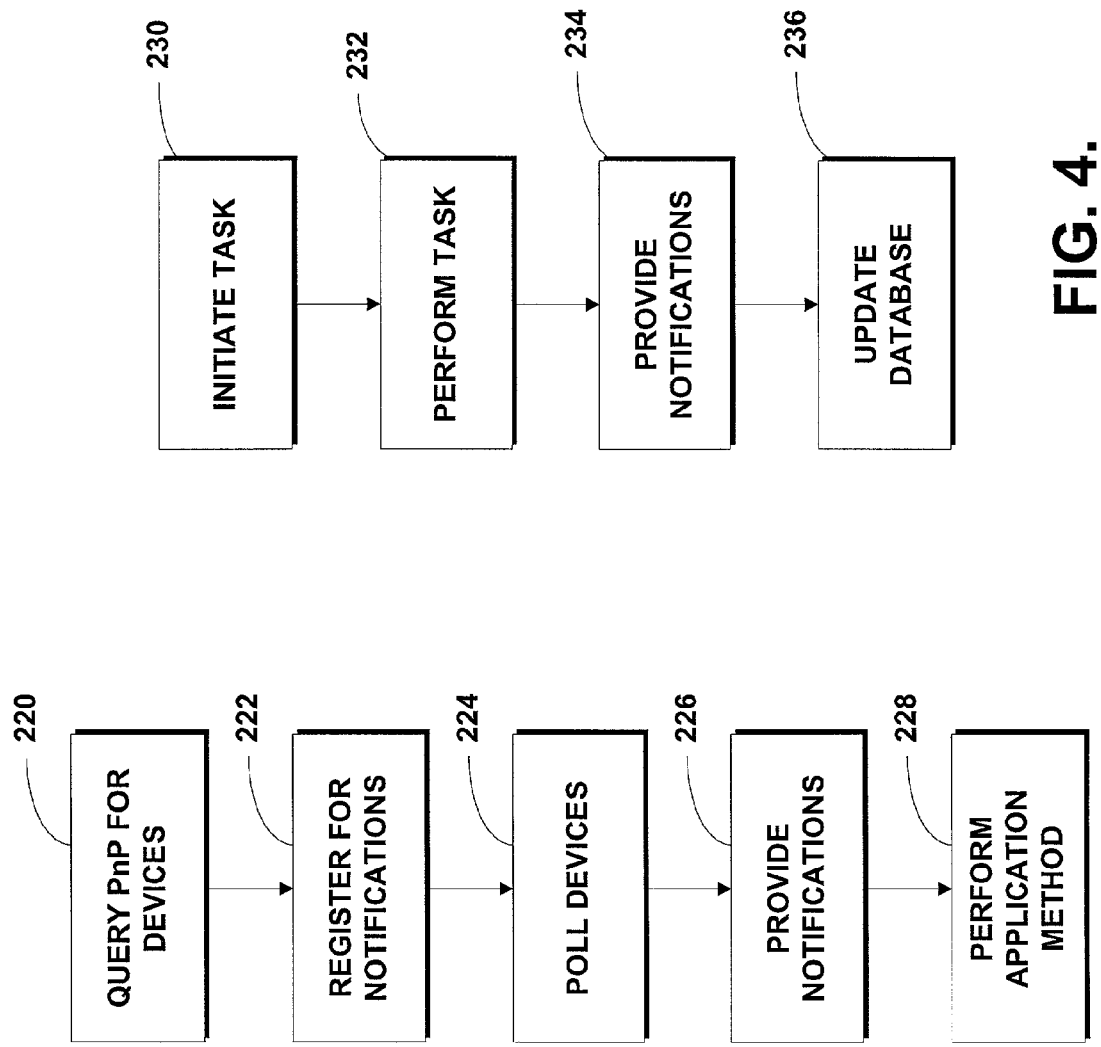

METHOD AND SYSTEM FOR PROVIDING STATE CHANGE NOTIFICATIONS IN DEVICE DRIVERS

TECHNICAL FIELD

The present invention relates generally to computer software and, more particularly, to a method and system for asynchronously notifying applications of state changes in removable devices.

BACKGROUND OF THE INVENTION

In conventional computer operating systems, library manager applications facilitate communication among client applications and removable storage devices. Removable storage devices are arranged by class and may include tape drives, disk drives (Zip drives, CD ROM, and optical disk drives) and changer libraries. Typically, each device class has an associated driver to control or regulate the device. Facilitating communication between the client application and removable storage devices includes having the library management application periodically poll the device drivers for state changes occurring with a particular device. Additionally, the library manager maintains a database that documents the location and identification for the removable devices.

When polling a device driver, the library manager typically receives a request to poll the drive from a client application. When the request is received by the library manager, the manager begins polling the device driver to determine if there has been a state change with the device. The device driver then determines the particular state of the drive and reports this information back to the library manager.

Several drawbacks exist in systems that utilize a library manager to poll for state changes in removable media. As mentioned above, the library manager begins polling only after receiving a request from one of its client applications. Thus, an event or a change may occur at a device without the library manager being notified of the event. For example, in tape drives, if the drive becomes dirty, client applications using that tape drive may detect that the drive is dirty, but do not notify the library manager of the condition. It is not until the library manager itself tries to use the tape drive that it knows that the drive is dirty. At that point, the library manager takes action to clean the drive. Thus, the library manager may miss events occurring at a device that may hinder the performance of the device.

The library manager performing the polling function for state changes presents another drawback because the library manager cannot poll the device when a client application is accessing the device. Library manager systems traditionally are used to detect media arriving and leaving a particular device. This typically occurs when client applications are not accessing the device. Thus, if an application is using the device and an event occurs, the library manager may not know of the event. For example, if the client application erases the content of the media in a device, the library manager would not know of the event.

The erasing function is one of several functions that changes the identification of the media. Current library manager systems fail to detect identification changes on the media. As mentioned above, the library manager maintains a database to monitor the identification of the media and device. Thus, if a client application alters the identification of the media without notifying the library manager, the library manager's database would not have accurate information which may lead to system failures when the library manager attempts to access the media at a subsequent time.

Utilizing a library manager to poll for device changes presents still another drawback because the library manager may miss events occurring at the device. For example, changer libraries include banks of multiple bays that contain the tape drives. The library has a door that is shut when the changer is in operation. An operator opens the changer door to access a particular bay to remove or add a tape into the drive. As noted above, in a typical operating system, the library manager includes a database with the information of the location of the particular drive within the changer library. If an operator were to open the door and remove a tape from one of the drives or move the tape from one drive to another, the library manager may not recognize the event. As mentioned above, the library manager only polls for state changes when a client application initiates the request. Thus, the library manager may not know when a tape has been removed or moved to another drive and the library manager's database would have inaccurate information. To maintain the integrity of the library manager database, the library changer doors are locked to prevent operators from moving the tapes to another drive or removing them completely. While this helps maintain the integrity of the database in the library manager, it is an inefficient solution.

As mentioned above, drivers are device specific. That is, each driver is associated with a certain class of devices. Sense codes are sent by the devices and are received by the drivers. The drivers can then interpret these codes to determine changes occurring at the device. Library managers do not receive all of the sense code data. Thus, managers may miss an event occurring at the device.

Accordingly, there exists a need to efficiently notify applications of state changes in removable devices. Moreover, there is a need for such a method and system that allows for device drivers to poll their associated devices and asynchronously notify applications of events occurring with the device.

SUMMARY OF THE INVENTION

Generally described, a method in a computer system for asynchronously notifying applications of state changes in a device by a device driver is provided. In accordance with the method, a device polls for one or more events using a device driver and each event has a corresponding change notification. One or more applications are then notified of the change notifications.

In another aspect of the invention, a method in a computer system for asynchronously notifying applications of state changes in a device using a device driver is provided. According to the method, a task to be performed on a device is initiated by a client application and the initiating of the task results in creating a change notification by the device driver. Interested applications are then notified of the change notification by the device driver.

In still another aspect of the invention, a computer system is provided for notifying applications of state changes in removable devices. The system includes a device driver that polls an associated device for state changes and provides change notifications corresponding to the state changes. The system also has one or more applications that receive the change notifications.

In yet another aspect of the invention, a computer system is provided for notifying applications of state changes in a device. The system includes an application that initiates a task to be performed on the device and a device driver that provides a change notification based upon the task.

A method and system are also provided for asynchronously providing interested applications of state changes in removable devices. A device driver polls its device for state changes and provides change notifications to the interested applications. The present invention also provides a change notification by a device driver to interested applications when a client application initiates a change in the device.

BRIEF DESCRIPTION OF THE SEVERAL VIEWS OF THE DRAWING

The present invention is described in detail below with reference to the attached drawing figures, wherein:

FIG. 3 is a flow diagram illustrating a method for polling devices with a device driver and providing change notifications to interested applications; and FIG. 4 is a flow diagram illustrating a method in a computer system for a client application initiating a change request and a device driver providing change notifications.

DETAILED DESCRIPTION OF THE INVENTION

Figure 1:
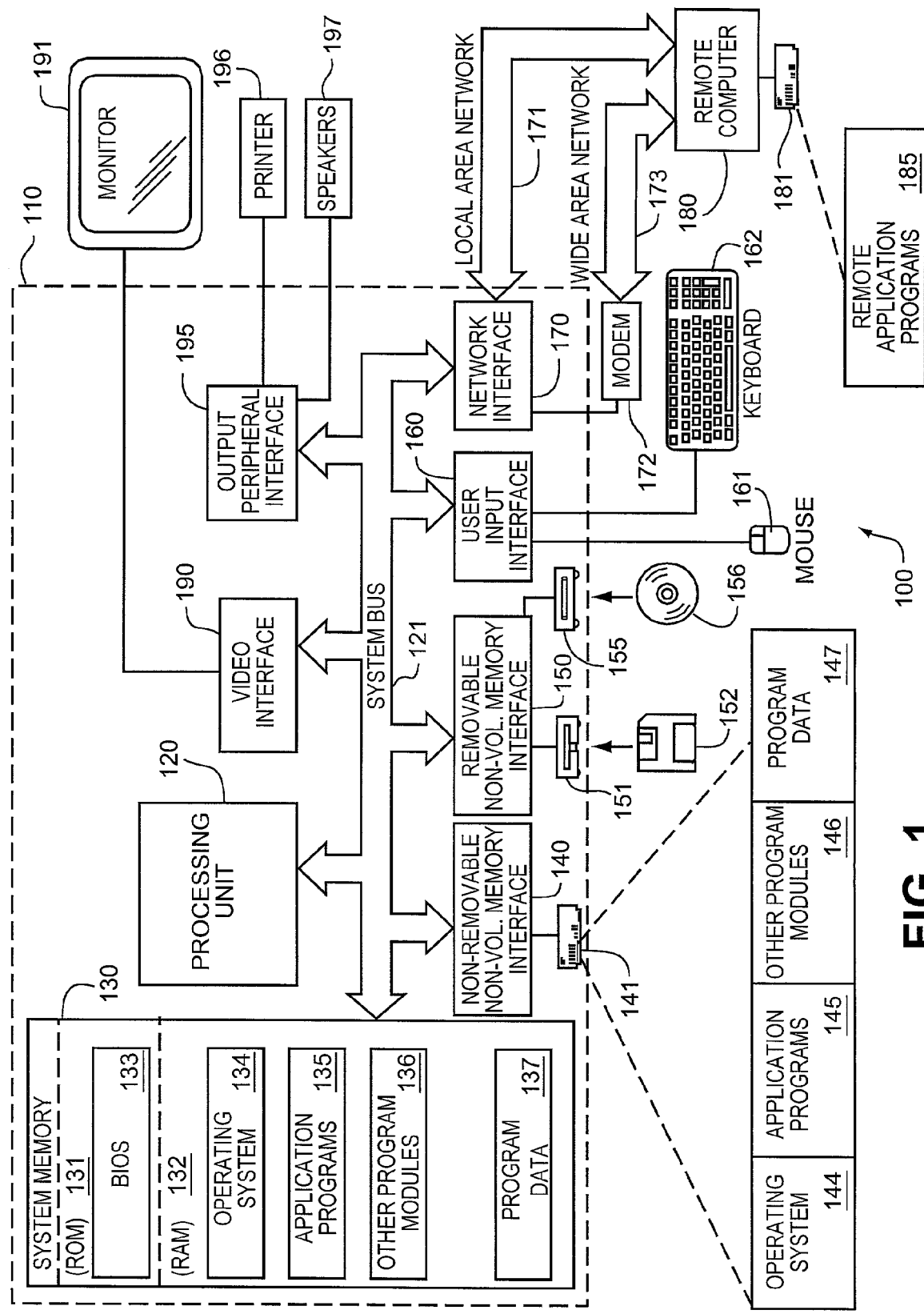
FIG. 1 is a block diagram of a computing system environment suitable for use in implementing the present invention.

The present invention provides a method and system for using device drivers to asynchronously notify applications of state changes. FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 141 is typically connected to the system bus 121 through a nonremovable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145,, other program modules 146, and program data 147 are given different numbers to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

The method and system of the present invention generates and issues change notifications regarding state changes occurring in removable storage devices associated with computer 110 using their associated class drivers. Although the method and system are described below as being implemented in a "WINDOWS" operating system by "MICROSOFT," one skilled in the art would recognize that the method and system could be implemented in any system supporting device drivers that asynchronously notify interested applications of state changes in their associated removable storage device.

Figure 2:
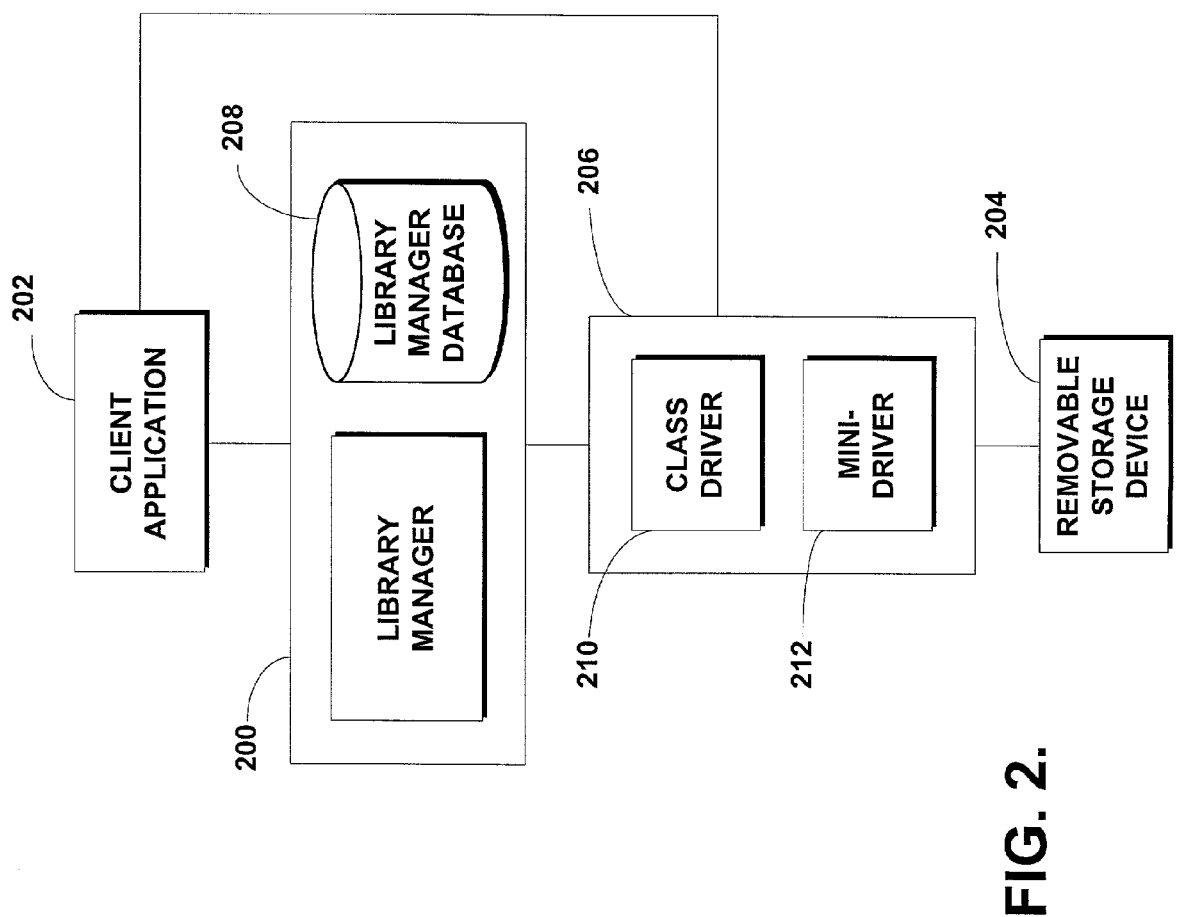
FIG. 2 is a block diagram illustrating the components used in the present invention.

Turning now to FIG. 2, a block diagram is provided that illustrates the basic components that are used to implement the present invention. The library manager 200 is an application that enables multiple client applications 202 to share one or more removable storage devices 204 and manages removable media within an operating system. Removable storage devices include, for example, robotic media libraries and tape or disc drives, such as drivers 151 or 155. While only one storage device 204 is shown in FIG. 2, it should be understood that multiple devices 204 are contemplated within the invention. The library manager 200 communicates with the removable storage devices 204 through a device driver 206 associated with the particular storage device 204. Within the library manager 200 is a database 208 that catalogs the various removable storage devices 204 and their associated media.

Client applications 202 utilize the library manager 200 to perform numerous functions associated with managing the removable storage devices 204. For example, computer systems with tape drives use the library manager to facilitate getting the media into and out of the drive. When a client application 202 needs to mount a tape, it issues a mount request to the library manager 200 for the specified tape. The library manager 200 reads the database 208 for the location and identification information for the specified tape. If the specified tape is off-line, the library manager 200 generates a request for an operator to insert the tape into the drive. If the tape is on-line, the library manager 200 uses the tape drive driver to mount the tape and then update the database 208. Additionally, when the tape is in the drive, the library manager 200 uses the tape driver to read the label on the tape. The library manager 200 then compares what was read from the label to the identification information in the database 208 to ensure that the correct tape was mounted.

The library manager 200 manages numerous classes of removable storage devices 204. These classes of devices include, but are not limited to, tape and disc drives, robotic changers and media libraries. Disc drives may include optical storage devices such as CD-ROMs and magnetic storage devices such as ZIP drives. Robotic changers typically include banks of tape drives or disc drives that automatically insert and remove media into the various drives using a robotic arm. The automated media libraries also include one or more doors to secure the banks of tape drives.

The driver 206 includes a class driver 210 and a device-specific mini-driver 212. This is a typical configuration for tape drivers. The class driver 210 performs functions that apply to an entire class of devices. As mentioned above, classes of devices may include tape drives, disc drives or tape changers. The mini-driver 212 is specific to a particular device. Mini-drivers are typically provided by independent hardware vendors to perform functions that are unique to a particular device.

The present invention implements a novel method and system for asynchronously notifying applications of state changes occurring in removable storage devices. That is, notifications are provided to interested applications when a change is detected. The provided notifications are sent independent of a predetermined schedule. These notifications are provided by the class driver 210 within a particular device driver 206. The device driver 206 periodically polls the device 204 for device events or changes in the state of the drive. Events or changes include, for example, media being inserted or removed, a dirty tape drive, library doors opening and closing, and changes that would alter the identification of the media. Identification changes may include erasing the content on the media or altering the label on the media. The library manager 200 maintains a database 208 that identifies the media and its corresponding content. Thus, the library manager 200 should be notified of changes made to the media or device.

Up to now, the discussion has centered around library manager 200 receiving device notifications. However, other applications, including the library manager's client applications 202, may be interested in receiving state change information from the removable storage devices 204. Having the device drivers 206 polling their respective devices 204 for events or changes allows for multiple applications to receive these notifications. If an application is interested in receiving notifications, the application first registers for events of interest. Then, when an event is detected by the driver, the driver calls a conventional I/O manager API to notify applications that are registered. The I/O manager calls all applications that are registered to receive notifications for this particular event. This ensures that all interested applications receive the same information about the removable device.

Referring now to FIG. 3, a flow diagram is provided that illustrates an example sequence for providing change notifications to interested applications and, more particularly, to a library manager. This sequence is only one example of a suitable method for providing notifications to applications using device drivers and is not intended to limit the scope or functionality of the invention. When the operating system of the computer is first initiated, the library manager 200 queries the Plug-N-Play (PnP) system for removable storage devices 204 the library manager may be interested in at step 220. For particular devices of interest, the library manager then registers for the notifications it wants to receive regarding the devices at step 222. As mentioned above, notifications include events such as a drive's unclean state, media erased, media arrival and removal. At step 224, the class driver 210 within the device driver 206 begins polling the device 204 for changes to the media or device. Should a state change occur, the driver 206 notifies the library manager 200 of the event at step 226. If other applications 202 have registered to receive notifications, the driver 206 will notify these other applications as well. At step 228, the library manager performs a method associated with a particular notification that includes a series of tasks. These tasks may include initiating a cleaning operation when a dirty tape drive notification is received. The application method may also include logging the event in the library manager database 208.

When registering for notifications at step 222, the library manager 200 provides a handler or a call back function. Each event that a driver 206 polls for has an associated globally unique identifier (GUID) that identifies the event. Each GUID is configured depending on the type of change or event that is being registered. When an event occurs, the driver 206 uses an API provided by an I/O manager to notify the library manager 200 at step 226. The I/O manager calls the library manager's call back routine, and one of the arguments passed is a GUID. This GUID is used by the library manager 200 to identify the notification being sent. For example, a GUID to notify of media arrival. Depending on the GUID or event, the library manager 200 interprets the data associated with that particular GUID and performs the appropriate method.

For example, when a tape drive becomes dirty, the driver 206 will detect a change within the device and respond by sending a notification to the library manager 200. The notification is passed along to the library manager 200 using a GUID. The library manager receives the GUID, notes that it is an event indicating that the drive is dirty, and then the library manager 200 responds by initiating a cleaning operation to clean the drive. If the drive is part of an automated library, the library manager knows where to look for the cleaning cartridge. The library manager has the cleaning cartridge moved to the drive which performs the cleaning operation, after which the cartridge is returned to its originating slot. Additionally, the library manager 200 updates its database 208 to indicate that the drive was dirty and what action it took in response to the change notification. If this is a stand-alone tape drive, the library manager 200 would notify the operating system and request that an operator of the computer be notified that the drive is dirty and requires cleaning.

Other notifications that may be detected by the device driver 206 polling its associated device 204 include, but are not limited to, media arrival and removal and door access in a tape changer library application. Automated tape changer libraries typically have doors that allow access to the entire bank of tape drives. When an operator wishes to remove a tape or move a tape from one drive to another, the door first must be opened to access the bays. In conventional systems, a library manager may not be notified of the opening of a tape changer library door. The device drivers 206 periodically polling for state changes, as in the present invention, allows the driver to know when a door is open on the tape changer library and allows the driver 206 to provide a notification of the event to the library manager. The library manager 200 can then update its database 208 whenever a change occurs with the device 204. In conventional systems, when a door is opened and a tape is removed or moved to another tape drive, the library manager may not be notified of the event. Because the library manager did not receive the state change information, its database would have inaccurate information as to the identity and the content of the media associated with that particular drive. By having the driver 206 continuously poll for these kinds of changes with the device 204, the library manager 200 can maintain the integrity of its database 208.

In other cases, the library manager 200 may wish to receive notifications of changes initiated by one of its client applications 202. A client application 202 may directly communicate with a particular device driver 206 whenever altering the identification of the media within the storage device 204. These identification changes include, but are not limited to, erasing media and adding or altering a label for the tape or device.

Turning now to FIG. 4, a flowchart is provided that illustrates a client application 202 initiating a request to alter the identification of media on a storage device 204. At step 230, the client application 202 initiates a particular task. This task may include, for example, an erase operation or a writing a label operation. The driver 200 receives the request and performs the initiated task at step 232. Upon completion of the task, the device driver 206 notifies the library manager 200 at step 234, of the change in identification for the media. The device driver 206 utilizes a GUID, as described above, to notify the library manager 200 of the identification change. The library manager can then update its database 208, at step 236, to indicate the change to the storage device 204. For example, a client application 202 initiates an erase operation to erase all the content on a particular tape. The client application 202 talks directly to the driver 206 via a WIN32 API to erase the tape when using the "WINDOWS" operating system available form "MICROSOFT." The driver 206 then notifies the library manager 200 of the erase operation and the library manager 200 then updates its database 208 to reflect the change in identity of the tape on that particular storage device 204.

When the library manager 200 queries the PnP for devices at step 220 (FIG. 3), it does so for only those devices that the library manager 200 would manage. These types of devices are typically limited to removable storage devices such as tape and disc drives and changer libraries. During this query process, the library manager 200 configures the device 204. This query returns a list of changers and libraries and a list of drives. Some of these drives may reside within the libraries themselves. When configuring a particular library device, the library manager determines the drives that are located within a particular changer library and associates that drive with the proper bay within the library.

The present invention has numerous advantages over prior art approaches by implementing change notifications in device drivers. Conventional systems typically utilize a library manager to poll the devices to determine the state changes. Moving the notification function down to the driver level expands the scope of events detectable by the driver for a particular device. Devices typically send sense codes to their assigned driver. The sense codes are then interpreted by the driver and information can be efficiently processed and sent to interested applications. Conventional systems utilizing a library manager to poll for state changes typically do not receive the sense code information. Thus, interested applications may miss important state information.

Providing notifications at the driver level presents another advantage in that devices are grouped according to class. Each device class is associated with a driver and different classes of devices send unique information. For example, a tape drive would send different information than a disc drive. Because the device drivers are class specific, they are in a better position than the library manager to interpret data and pass along information being sent by the device. Moreover, because the driver is performing the polling, the polling is done in kernel mode. This is in contrast to the library manager performing the polling in user mode. Advantageously, the kernel mode polling has much less overhead than user mode polling.

As mentioned above, client applications may initiate state changes in a device. In an operating system that uses a library manager to poll for state information, client applications request the library manager to poll the device. Further, client applications are responsible for notifying the library manager of changes they may initiate on a particular device or media. Thus, if an application fails to notify the library manager of the state change, the library manager never sees the change. Providing notifications in the device drivers ensures that the library manager is notified of all interested changes occurring with the device.

Alternative embodiments of the present invention become apparent to those skilled in the art to which it pertains upon review of the specification, including the drawing figures. The various computer systems and components shown in FIGS. 1–4 and described in the specification are merely exemplary of those suitable for use in connection with the present invention. Accordingly, the scope of the present invention is defined by the appended claims rather than the foregoing description.

We claim:

1. A method in a computer system, comprising:
using a device driver, independently polling a removable media storage device associated with the device driver for one or more events occurring at the removable media storage device, wherein each event has an associated change notification, wherein the removable media storage device is part of a media changer library including one or more removable media storage devices; and
sending, by the device driver, the change notification to a library manager, wherein the library manager manages media at the one or more removable media storage devices of the media changer library.

2. The method as recited in claim 1 further comprising registering with the device driver, by the library manager, for one or more change notifications desired to be received by the library manager from the device driver.

3. The method as recited in claim 1, wherein the change notification includes a globally unique identifier to identify the event.

4. A computer-readable storage medium having computer-executable instructions for performing the method recited in claim 1.

5. A computer system having a processor, a memory, and an operating environment, the computer system operable to execute the method recited in claim 1.

6. A method in a computer system, comprising:
initiating a task by a client application to be performed on a removable media storage device, said task resulting in a state change of the removable media storage device, wherein the removable media storage device is part of a media changer library including one or more removable media storage devices;
using a device driver associated with the removable media storage device, said device driver independently polling said removable media storage device to create; a change notification corresponding to the initiated task; and
notifying, by the device driver, a library manager of the change notification, wherein the library manager manages media at the one or more removable media storage devices of the media changer library.

7. The method as recited in claim 6, notifying, by the device driver, a second client application of the change notification.

8. The method as recited in claim 6, further comprising registering for one or more change notifications desired by the library manager.

9. The method as recited in claim 6, wherein the initiated task alters identification information on media in the removable media storage device.

10. The method as recited in claim 6, wherein the change notification includes a globally unique identifier to identify the event.

11. A computer-readable storage medium having computer-executable instructions for performing the method recited in claim 6.

12. A computer system having a processor, a memory, and an operating environment, the computer system operable to execute the method recited in claim 6.

13. A computer system for notifying applications of state changes in removable media storage devices of a media changer library, the system comprising:
 a device driver that independently polls an associated removable media storage device for state changes at the removable media storage device and provides change notifications corresponding to the state changes;
 a library manager to manage media at the removable media storage devices of the media changer library, wherein the library manager includes a database to maintain identity and content of the media at the media changer library, the library manager to receive the change notifications from the device driver; and
 one or more applications that receive the change notifications from the device driver.

14. The computer system as recited in claim 13, wherein the one or more applications register for the change notifications that the one or more applications desire to receive from the device driver.

15. The computer system as recited in claim 13, wherein the change notifications include a globally unique identifier to identify the event.

16. The method of claim 1, wherein the polling is done in kernel mode.

17. The computer system of claim 13, wherein the polling is done in kernel mode.

18. The computer system of claim 13, wherein the device driver comprises a class driver and a device-specific mini driver.

19. The computer system of claim 18, wherein the class driver does the polling.

20. The computer system of claim 18, wherein the class driver provides the change notification.

21. The computer system of claim 18, wherein the class driver provides the change notification.

22. The method of claim 1, further comprising registering, by an application, for one or more change notifications desired to be received by the application.

23. The method of claim 7, further comprising registering for one or more change notifications desired by the second client application.

24. The method of claim 3, wherein the change notification is based on a sense code from the removable media storage device.

25. The method of claim 10, wherein the change notification is based on a sense code from the removable media storage device.

26. The method of claim 15, wherein the change notification is based on a sense code from the removable media storage device.

27. A method, comprising:
 registering, by a library manager, for an event notification from a device driver associated with a tape drive of a tape changer library having a plurality of tape drives, wherein the library manager to manage tapes at the tape changer library, the library manager including a database that identifies tapes and content of the tapes in the tape changer library;
 independently repeatedly polling, by the device driver, the tape drive for the occurrence of an event associated with the registered event notification; and
 providing, by the device driver, the event notification to the library manager in response to the event occurring at the tape drive.

28. The method of claim 27, further comprising performing, by the library manager, a method associated with the event in response to receiving the event notification.

29. The method of claim 28 wherein the event notification includes a dirty tape drive notification, wherein the method includes initiating a tape drive cleaning operation.

30. The method of claim 28 wherein the event notification includes altered tape identification information on the tape, wherein the method includes updating the database with the new tape identification information.

31. The method of claim 30 wherein the event notification is associated with a tape erase operation on the tape or a label write operation on the tape.

32. The method of claim 27 wherein the event notification includes one of tape insertion or tape removal.

33. The method of claim 27 wherein the event notification includes a tape changer library door of the tape changer library is open.

34. The method of claim 27, further comprising logging, by the library manager, the occurrence of the registered event in the database.

* * * * *